H. H. STEELE.
TYPE WRITING MACHINE.
APPLICATION FILED MAR. 23, 1911.

1,012,929.

Patented Dec. 26, 1911.
3 SHEETS—SHEET 1.

FIG. I.

WITNESSES:

INVENTOR:
Herbert H. Steele
By Jacob Felbel
His ATTORNEY

H. H. STEELE.
TYPE WRITING MACHINE.
APPLICATION FILED MAR. 23, 1911.

1,012,929.

Patented Dec. 26, 1911.
3 SHEETS—SHEET 2.

WITNESSES:

INVENTOR:
Herbert H. Steele
By Jacob Felbel
HIS ATTORNEY

H. H. STEELE.
TYPE WRITING MACHINE.
APPLICATION FILED MAR. 23, 1911.

1,012,929.

Patented Dec. 26, 1911.
3 SHEETS—SHEET 3.

WITNESSES:

INVENTOR:
Herbert H. Steele
By Jacob Felbel
HIS ATTORNEY

UNITED STATES PATENT OFFICE.

HERBERT H. STEELE, OF MARCELLUS, NEW YORK, ASSIGNOR TO THE MONARCH TYPE-WRITER COMPANY, OF SYRACUSE, NEW YORK, A CORPORATION OF NEW YORK.

TYPE-WRITING MACHINE.

1,012,929.  Specification of Letters Patent.  Patented Dec. 26, 1911.

Application filed March 23, 1911. Serial No. 616,319.

*To all whom it may concern:*

Be it known that I, HERBERT H. STEELE, citizen of the United States, and resident of Marcellus, in the county of Onondaga and State of New York, have invented certain new and useful Improvements in Type-Writing Machines, of which the following is a specification.

My invention relates to typewriting machines and more particularly to means whereby tabulating operations may be automatically effected as the writing proceeds, and without the exercise of any care or judgment on the part of the operator and without the actuation of tabulating keys.

A further object of my invention is to provide means by which the release of the feed rack is automatically effected as the carriage is returned to begin a new line, in order that the automatically operating tabulating mechanism may be thrown out of operation and not interfere with or be affected by the return movement of the carriage.

To the above and other ends which will hereinafter appear, my invention consists in the features of construction, arrangements of parts and combinations of devices to be hereinafter described and particularly pointed out in the appended claims.

In the accompanying drawings wherein like reference characters indicate corresponding parts in the various views.

I have illustrated my invention in the present instance in a Monarch typewriting machine; only so much of said machine being shown, however, as is necessary to illustrate the invention in its embodiment therein.

The corner posts 1 support a top plate 2 upon which fixed guide rails 3 are supported on brackets 4 secured to the top plate. The fixed guide rails are grooved on opposite faces thereof to receive anti-friction balls or rollers 5 which are likewise received in oppositely grooved guide rails 6 formed on opposite edges of a rear guide bar 7 of the carriage. The carriage is connected to a spring drum 8 by means of a band 9. which latter is connected at one end to the spring drum and at its opposite end to a depending pin 10 secured to the carriage. Forwardly extending end bars 11 are carried by the carriage bar 7 at the ends thereof. The end bars are provided with bearings to receive a platen shaft 12 which supports a cylindrical platen 13. The left-hand end of the platen is provided with the usual line spacing ratchet wheel 14 (shown in dotted lines in Fig. 1), with which a line spacing pawl 15 coöperates. The line spacing pawl is pivoted at 16 (Fig. 10) to a carrying arm 17, and is actuated by the usual rock shaft 18 mounted to turn in a bearing 19 and provided with a finger piece 20. In this construction a swinging movement of the finger piece 20, to effect a line spacing movement of the platen, is in the general direction of the return movement of the carriage; a spring 21 (Fig. 1) being employed to restore the line spacing devices to normal position after each actuation.

The manner in which the line spacing mechanism is coöperative with other features of the construction to facilitate the return movement of the carriage without being affected by the automatically operating tabulating mechanism or without affecting such tabulating mechanism will hereinafter more clearly appear.

The step-by-step feed of the carriage is effected under control of the usual escapement mechanism comprising a key controlled dog rocker 22 provided with feed dogs 23 and 24. These dogs coöperate with an escapement wheel 25 operatively connected to an escapement wheel shaft 26 by the usual pawl and ratchet mechanism contained within a drum 27. The shaft 26 is mounted to turn in a bearing 26ª secured to the top plate of the machine and the forward end of the shaft has a feed pinion 28 operatively connected thereto. This feed pinion meshes with a feed rack 29 carried by rearwardly extending arms 30 having trunnion-like pivots 31 pivoted to turn in bearing openings in the end bars 11 of the carriage. Each of the pivots 31 is extended beyond the end plate 11 in which it receives a bearing for connection with a forwardly extending release arm 32 provided with a finger piece at the forward end thereof. A depression of either of the finger pieces connected to the arms 32 is therefore effective to turn the feed rack on its pivots 31, to move the feed rack upwardly out of engagement with its coöperative feed pinion.

The parts as thus far described constitute portions of the Monarch machine, although some of these parts are modified as will hereinafter appear.

I will first describe the mechanism by which tabulating operations are automatically effected during the travel of the carriage.

Figure 1:
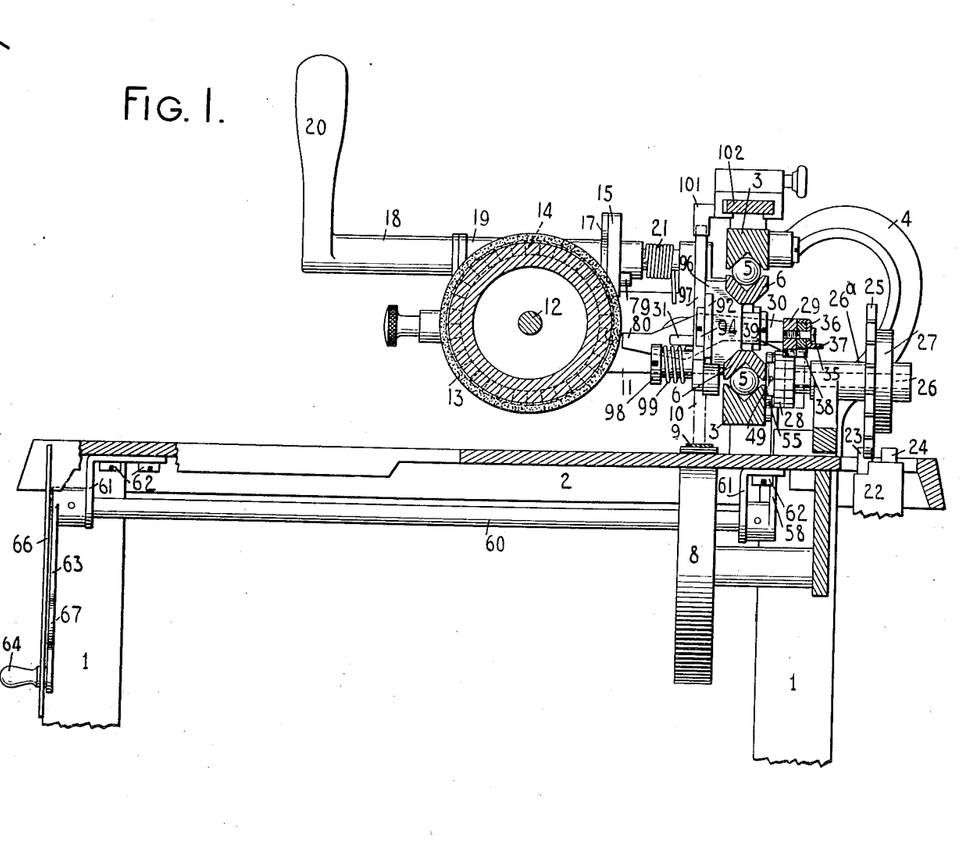
Figure 1 is a vertical front to rear sectional view with parts broken away; the view showing the upper portion of a typewriting machine embodying my invention.
Figure 2:
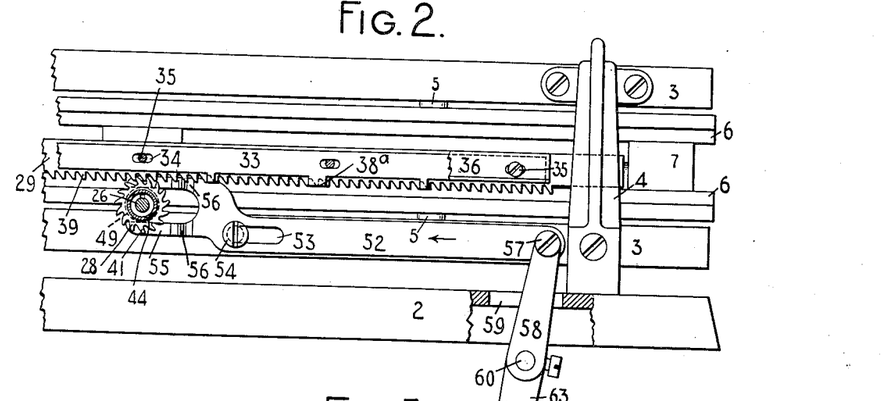
Fig. 2 is a fragmentary rear elevation of the same with parts in section.

Referring first more particularly to Figs. 1 to 6 of the drawings it will be observed that the feed rack 29 has a disengaging or tooth-space closing device, designated as a whole at 33, secured to the rear side thereof. This disengaging device, in the present instance, is in the nature of a plate which is substantially co-extensive in length with the feed rack and is supported in place parallel therewith. The body portion of this plate is slotted at 34 to receive the stems of headed screws 35 threaded into tapped openings in the feed rack. A plate 36 is arranged in the rear of the device 33 and is apertured to receive the stems of the screws 35 which pass freely through the apertures in the plate. The lower edge of this plate 36 is bent rearwardly at substantially right angles to the body portion thereof to form a flange 37. This flange coöperates with the usual back spacing mechanism employed in the Monarch machine, and which, for the purpose of my present invention, there is no necessity of illustrating. From the foregoing description it will be understood that the screws 35 constitute binding screws, the heads of which bear against the plate 36, and by tightening these screws the plate 33 may be clamped between the plate 36 and the feed rack to hold the plate 33 in the position to which it may be adjusted longitudinally of the feed rack; the screws 35 and slots 34 affording such longitudinal adjustment of the plate 33. The plate 33 is provided with depending, disengaging or closing projections 38 which extend downwardly from the body portions of the plate to the lower ends of the teeth 39 of the feed rack. There is a plurality of these depending projections 38 and 38ª and they may be of various thicknesses, considered longitudinally of the feed rack. Thus, it will be observed that the depending projection 38ª in Fig. 2 is twice the width of the depending projections 38 shown in the other figures. The projections 38 are each of a width or thickness which corresponds substantially to the space 40 between two adjacent teeth 39 of the feed rack, whereas the projection 38ª is of a width of thicknesses which corresponds substantially to two of such spaces. The projections 38, 38ª are in the same plane as the body portion of the plate 33 so that these projections are arranged at one side of the feed rack and adjacent to the spaces 40 between the teeth thereof. While these projections do not enter the spaces between the teeth they are, nevertheless, effective under certain conditions to close or block the spaces against the admission of the teeth 41 of the feed pinion 28 therein. It will be understood that a longitudinal adjustment of the member 33 is effective to adjust the projections 38, 38ª at different positions along the feed rack in order to bring them opposite different spaces 40 between the teeth of the feed rack, and thereby regulate the points in the travel of the carriage where automatic disconnection between the feed rack and pinion shall take place to afford automatic tabulations as will hereinafter more clearly appear.

Figures 9, 10, 11:
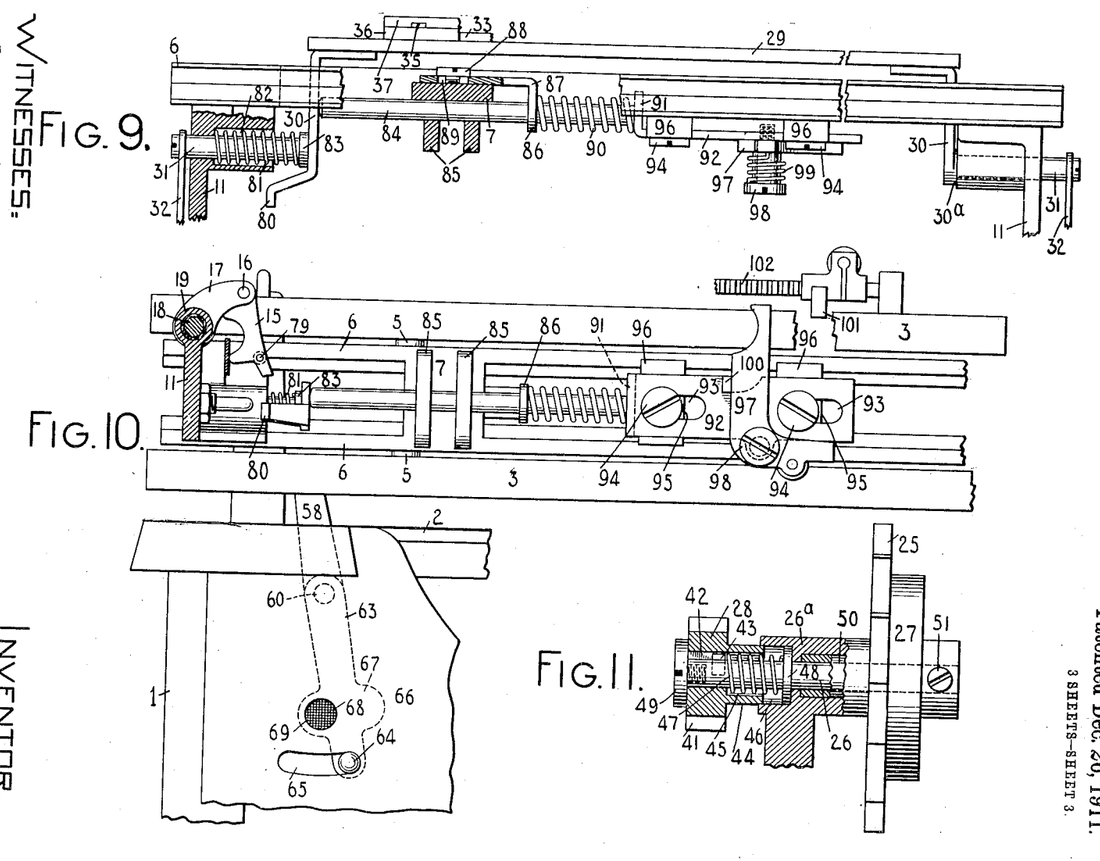
Fig. 9 is a fragmentary plan view with parts in section; the view showing part of the carriage, the feed rack and means associated with the feed rack.
Fig. 10 is a fragmentary front elevation of the same, together with a portion of the line spacing mechanism.
Fig. 11 is a detail vertical sectional view of a portion of the escapement mechanism.

Referring now more particularly to Fig. 11 it will be seen that the feed pinion 28 has a spline groove 42 therein for the reception of a spline 43 which projects from the escapement wheel shaft 26. The pinion is likewise formed with a hub 44 counterbored at 45 to form a housing, and this hub receives a bearing in a counterbored portion 46 in the bearing member 26ª. An expansion spring 47 surrounds the shaft 26 and is contained within the housing formed by the counterbored portions 45 and 46. This expansion spring bears at one end against the inner wall of the counterbore 45 in the hub and at its opposite end against a circumferential flange 48 on the shaft 26. A headed screw 49 is received in a tapped opening in the forward end of the shaft 26 to limit the forward axial movement of the pinion 28 on its shaft. The escapement wheel 25 is provided with a hub 50 received in a bearing opening in the member 26ª, whereas a screw 51 connects the housing 27 with the shaft 26 and prevents an axial movement of the shaft 26 in one direction; an axial movement of the shaft in the opposite direction being prevented by the circumferential flange 48 bearing against a bottom wall of the counterbored portion 46.

From the foregoing description it will be understood that the feed pinion is positively connected to turn with the shaft 26 but is adapted to be moved axially along the shaft 26 from the normal position shown in full lines in Fig. 1 to the dotted line position shown in that figure. The axial movement of the pinion just described is effective to move it into or out of the path of the disengaging projections 38 or 38ª as will be understood upon reference to Fig. 1. The means for effecting this axial movement of the feed pinion will now be described.

Figure 3:
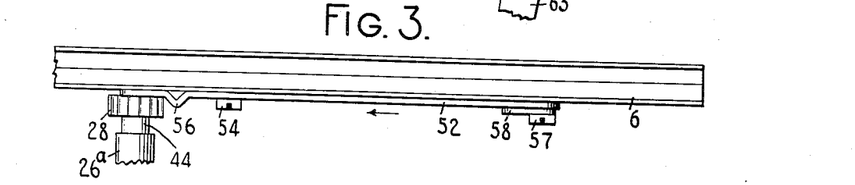
Fig. 3 is a fragmentary plan view of some of the parts shown in Fig. 2.
Figure 4:
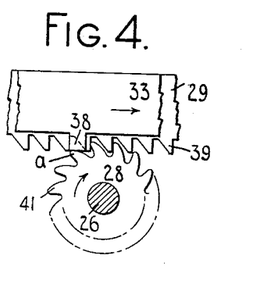
Figs. 4, 5 and 6 are fragmentary detail rear elevations of the feed pinion, feed rack and disengaging device; the different views showing the parts disposed as they appear at different points in the travel of the carriage.

Referring more particularly to Figs. 1, 2 and 3 of the drawings it will be observed that a sliding bar or plate 52 is mounted on the rear side of the lower fixed guide rail 3; the slide being slotted at 53 to receive the stem of a headed screw 54 threaded into a tapped opening in the lower fixed guide rail 3. The inwardly extending end of the slide 52 is bifurcated to form two arms 55 which straddle and are supported by the head of the screw 49 as indicated in Figs. 1 and 2. These arms are bent to form cams 56 (see Fig. 3). The outer end of the slide 52 is pivoted at 57 to an upwardly extending crank arm 58 which extends through a slot 59 in the top plate of the machine. The lower end of this crank arm is fixed to a rock shaft 60 supported by brackets 61 secured by screws 62 to the top plate of the machine. This rock shaft extends from the rear of the machine forwardly to the front thereof where it is provided with a depending crank arm 63. The lower end of this arm is provided with a forwardly extending finger piece 64 which extends through a slot 65 in the front plate 66 of the machine. The crank arm 63 is enlarged at 67 as indicated in dotted lines in Fig. 10. This enlarged portion is provided with indicating means 68 adapted to register with a sight opening 69 in the front plate 66 of the machine. Any suitable indicating means 68 may be employed, such, for instance, as contrasting colors, to indicate the different positions of the finger piece 64 and the parts controlled thereby, or the indicating means may be in the nature of words such as "In" and "Out", meaning in or out of operation. It will be understood that when the finger piece 64 is at the limit of its movement in one direction the slide 52 will be in the position represented in Figs. 1, 2 and 3 where the cams 56 are out of engagement with the feed pinion and the feed pinion is maintained out of the path of the disengaging projections 38, 38ª. At this time the automatically operating tabulating mechanism is rendered inoperative because the feed pinion is maintained out of the path of the projections 38, 38ª. If, on the other hand, the finger piece 64 is moved to the limit of its movement in the opposite direction, the slide 52 will be moved in the direction of the arrow in Figs. 2 and 3, thereby bringing the cams 56 into coöperation with the rear face of the feed pinion 28, camming the latter rearwardly against the pressure of its spring 47 to the position indicated in dotted lines in Fig. 1. This axial movement of the feed pinion is effective to bring the teeth thereof into the path of the disengaging projections 38 and 38ª. The cams 56 will be maintained in either of the positions to which they are moved by the finger piece so that the axial position of the feed pinion, as determined by an actuation of the finger piece 64, is maintained until the position of said finger piece is changed.

Figure 5:
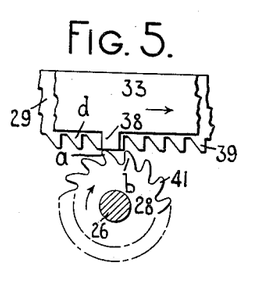
Figure 6:
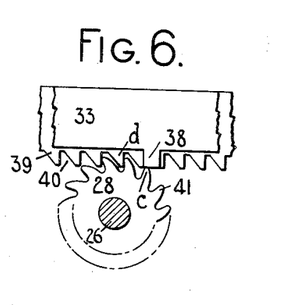

It may be assumed that the feed pinion is in the operative position indicated in dotted lines in Fig. 1 when the teeth of the pinion are adapted to co-act with the disengaging projections 38 or 38ª to effect an automatic disengagement of the rack from the pinion. Thus, during the feed movement of the carriage in the direction of the arrow in Fig. 4, a disengaging projection 38 will be brought into coöperation with a tooth *a* on the feed pinion. The next letter space movement of the carriage is effective to move the pinion to the position shown in Fig. 5. This automatically effects a lifting of the rack to disengage the rack from the pinion, as indicated in Fig. 5, and the rack being freed from the pinion is adapted to move in the direction of its feed until the projection 38 is carried beyond the tooth *b* of the feed pinion. When this tooth *b* is passed the pressure of the usual spring (not shown) exerted on the feed rack tends to depress the feed rack and to bring the projection 38 into engagement with the tooth *c* of the feed pinion as illustrated in Fig. 6. This enables a reestablishment of the engagement between the feed rack and pinion to be effected. It will be understood that the free skipping movement of the carriage thus effected is operative to move the tooth *d* of the feed rack from the position shown in Fig. 5 to that indicated in Fig. 6. The extent of this movement in the present instance corresponds to two teeth of the feed rack or to two letter spaces, although the extent of such skipping movement depends on the width of the projection 38 or 38ª or whether it blocks one or more spaces 40 of the feed rack against the admission of the teeth of the feed pinion thereto. Moreover, the extent of skipping movement of the rack depends somewhat on the character of the teeth of the feed pinion and feed rack.

It should be understod that the location of the projections 38 or 38ᵃ along the member 33 is predetermined in accordance with the character of the work to be produced, and in order that one member 33 may be readily detached and another such member with differently spaced projections thereon be substituted therefor, it is merely necessary to withdraw the screws 35 and replace one member 33 by another. Of course, it will be understood that the adjustment of the projections to different set positions longitudinally of the feed rack may be effected by a longitudinal adjustment of the member 33 in the manner hereinbefore described.

Figure 7:
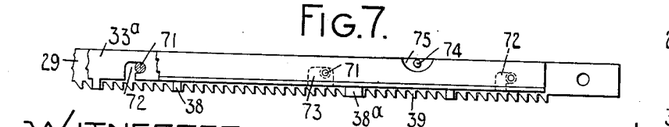
Fig. 7 is a fragmentary detail rear elevation, with parts broken away and in section, of a modified form of disengaging device and a feed rack with which it is associated.
Figure 8:
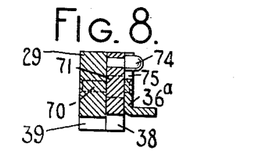
Fig. 8 is a transverse sectional view of the same.

In Figs. 7 and 8 I have shown a modified form of the construction in which the disengaging member 33ᵃ may be even more readily detached from the feed rack to afford a substitution of another of said disengaging devices therefor. In this modified form of the construction the plate 36ᵃ is riveted to the feed rack by rivets 70 each having an enlarged shouldered portion 71 which maintains the plate 36ᵃ properly spaced apart from the feed rack. The member 33ᵃ is provided with a series of angular slots 72 each of which is coöperative with the enlarged portion of one of the rivets 70. Coöperative with one of the rivets 70 is an enlarged cut out 73 in the body portion of the member 33ᵃ. This affords a limited longitudinal movement in both directions and also affords a movement of the plate transversely of the feed rack to effect a detachment of the plate from the feed rack. To facilitate such a detachment of the member 33ᵃ or the substitution of one for another, I have provided rearwardly extending finger pieces 74 on each of the plates 33ᵃ. These finger pieces extend through enlarged openings or cutouts 75 in the plate 36ᵃ so that the movement of the finger pieces both longitudinally and laterally of the feed rack is not interferred with. It will be understood that by moving the member 33ᵃ to the right, as the parts are shown in Fig. 7, the plate is disposed so that the rivets 70 are displaced from the horizontal portions of the angular slot 73 and are brought into alinement with the vertical portions of the slots and the member 33 may be lifted out at this time with the aid of the finger pieces 74, and readily detached from the feed rack. Another member 33ᵃ, with differently spaced disengaging projections, may be readily substituted for the member removed.

In order that an understanding of the use of the automatically operating tabulating mechanism may be clearly arrived at, it may be assumed, for example, that a work sheet is ruled vertically to divide it into different columns. The head of each of these columns may have a printed indication or caption. In many freight bills, way bills and tabulated reports a certain number of characters are uniformly printed at each line in the same column so that a given extent of space or skipping movement of the carriage is required between the last written character in one column to the point where the first character in the next column is to be written. Thus, for example, in the first column under a heading such as "No. of pkgs." may appear the characters "XXXX" and from the last written character in this column to the first character say, "Z" in the next column, there may be two spaces, so that it requires a movement of two spaces to properly position the carriage to receive the imprint of the first character "Z" in the second column. This is automatically effected during the feed movement of the carriage by the different projections 38 in the manner hereinbefore described. The operator proceeds to fill in the second column and at the end of said column the carriage will be automatically moved to bring the work sheet to a position where the first character in the third column may be written in the proper position in that column, and so on through the successive columns; the space between each two columns being the same. It will be understood, therefore, that there is no necessity on the part of the operator to exercise care or judgment in the movement of the carriage from one position to another to bring the successive columns into proper position to receive the imprints, and that there is no necessity for actuating special tabulator keys in order to effect the tabulating operations. The mind of the operator can, therefore, be wholly concentrated on the indications which are to appear in each column. Should the operator desire at any time to throw the automatically operating tabulating mechanism out of operation, it is merely necessary to shift the finger piece 64, thereby moving the cams 56 to the position shown in Fig. 2 and the feed pinion will move axially to the full line position shown in Fig. 1, thereby carrying it out of the path of the disengaging projections and the carriage will feed in the ordinary manner and the disengaging projections will be rendered ineffective.

I will now describe the means by which the tabulating mechanism is automatically rendered inoperative, during the return movement of the carriage, to affect the travel of the carriage or to be affected by the travel of the carriage. The line spacing pawl 15 is provided with a pin 79 which, during the downward or line spacing movement of the pawl, engages a forwardly extending arm 80 in the nature of a forwardly projecting offset extension of the left-hand arm 30, by which the feed rack is pivoted to the carriage. The effect of this engagement between the pin 79 and arm 80 is to automatically elevate the feed rack and disengage it from the feed pinion when the finger piece 20 is actuated to effect a line spacing movement of the carriage and the return of the carriage to begin a new line of writing. Upon reference to Fig. 9 it will be observed that the mounting for the feed rack is such that a relative movement between the carriage and feed rack, longitudinally of the latter, may be effected. Thus an expansion spring 81 surrounds the left-hand pivot 31 of the feed rack and is received in a counterbored portion 82 in the left-hand end bar of the carriage. This spring bears at one end against the bottom wall of the counterbored portion 82 and at its opposite end against a shoulder 83 on the pivot 31. The pressure of this spring is therefore exerted to press the feed rack to the right with reference to the carriage; this pressure being resisted by the engagement of a hub 30ª of the right-hand arm 30 with the pivot bearing of the right-hand end bar of the carriage, as shown in Fig. 9. The pressure of the spring 81 on the feed rack is also effective to maintain the left-hand arm 30, normally, in contact with the free end of a rod 84, as indicated in Figs. 9 and 10. The rod 84 is mounted for longitudinal movement through bearing openings in web-like forwardly extending projections 85 on the carriage bar 7. This rod likewise extends through an opening in a forwardly extending bracket arm 86, which has its foot piece 87 adjustably secured to the carriage bar 7 by a screw and slot connection 88, 89. This means affords an adjustment of the bracket 86—87 in the direction of the length of the rod 84. An expansion spring 90 surrounds the rod 84 and bears at one end against the bracket arm 86 and at its opposite end against a forwardly turned arm 91 of a carrier designated as a whole by the reference numeral 92. This carrier is preferably formed of sheet metal and is slotted at 93 to receive the stems of headed screws 94 threaded into tapped openings in guides 95 fixed to the carriage bar 7. These guides have forwardly extending projections 96 between which the longitudinally movable support 92 is guided and adapted to move. The rearwardly extending arm 91 of the carrier is fixed to the rod 84 so that the carrier and rod are adapted to move longitudinally together; the limit of such movement being determined by the slots and screws 93 and 94, respectively. An adjustment of the bracket 86—87 is effective to increase or decrease the pressure exerted by the spring 90. A margin stop member 97 is pivoted by a shouldered pivot screw 98 to the carrier 92. A spring 99 is coiled about the pivot 98 of this stop and is connected at one end to the stop and at the other end to the screw to turn the stop on its pivot and normally maintain the stop against a forwardly projecting stop member 100 struck up from the slide or carrier 92. The upper end of the margin stop 97 is adapted to engage an adjustable margin stop 101 carried by and adjustable along a rack 102 supported on the upper fixed guide rail 3. It will be understood that as the carriage is moved from left to right the margin stop 97 will be brought into coöperation with the margin stop 101 on the frame of the machine to arrest the carriage in a position to begin a new line of writing. If unusual force is applied to the carriage in its return movement, the stop 97 will be arrested by the coöperation therewith of the stop 101 but the carriage may continue its movement a short distance independently of the member 92 and the margin stop 97 and the rod 84 carried thereby. This further independent movement of the carriage is effective to compress the springs 90, to absorb the shock incidental to the violent return of the carriage. A further effect of this movement of the carriage independently of the slide 92, and the parts carried thereby, is to cause the line spacing mechanism, including the depressed pin 79, to travel to the right independently of the rod 84, and independently of the feed rack 29, which at this time is held against longitudinal movement by the rod 84. The result of this is to disengage the pin 79 from the arm 80, thereby automatically releasing the feed rack and insuring a proper reëngagement between the rack and pinion.

The operation of these parts will probably best be understood from a more detailed operation of the return movement of the carriage effected through a movement of the finger piece 20. Thus when the carriage is to be returned to begin a new line of writing, the operator returns the carriage by means of the finger piece 20 to effect a line spacing actuation as well as a return of the carriage, at a single operation. As the line spacing pawl 15 is depressed, by the operation of the finger piece 20, the pin 79 on the pawl depresses the arm 80 and automatically disengages the feed rack from the pinion, so that during the return movement of the carriage the disengaging projections 38, 38ª will be thrown out of operation, even if the feed pinion be maintained in the dotted line position shown in Fig. 1. The disengaging projections are therefore rendered ineffective at the return movement of the carriage to coöperate with the feed pinion or to operate automatically to bring about the disengagement between the rack and pinion which, of course, at this time is unnecessary. In this manner all bumping or jumping action between the disengaging projections and feed pinion is avoided during a rapid return of the carriage to the right. Pressure on the finger piece 20 being maintained throughout the return movement of the carriage, it follows that the feed rack is maintained disengaged. When the margin stop 97 is brought into coöperation with the coöperative margin stop 101, the margin stop 97, slide 92, rod 84 and the feed rack 29 will be held against further movement to the right while a slight continued movement of the carriage may be effected relatively to these parts and against the pressure of the spring 90. This continued movement of the carriage is effective to carry the pin 79 to the right of the arm 80, and said arm being no longer maintained depressed by the action of the line spacing pawl thereon will instantly reëngage the feed pinion before pressure is released on the finger piece 20 and before the finger piece and the pawl controlled thereby are restored to normal position. The effect, therefore, of the automatic disconnection of the elevated feed rack from the line spacing pawl is to effect an instant reëngagement between the feed rack and pinion. This assures a proper engagement between these parts to begin a new line of writing, and the construction prevents the shock or jar due to the engagement between the margin stops from displacing the feed rack longitudinally, which might result in bringing about an engagement between the feed rack and pinion at an improper point due to a rebound of the carriage. It will be understood, therefore, that the automatic release of the feed rack, in the manner described, during the return of the carriage and during the actuation of the line spacing mechanism assures the throwing out of operation of the automatically operating tabulating mechanism during the return of the carriage and thereby prevents the parts from being injured by a violent return of the carriage to begin a new line of writing.

The shock absorbing construction for the margin stops is somewhat similar to that disclosed in my Patent No. 892,627, dated July 7th, 1908. Said patent contains broad claims covering the present shock absorbing constructions; the claims herein being restricted to features not disclosed in said patent. Moreover, certain of the features disclosed herein are claimed broadly in a companion application filed by me of even date herewith and bearing Serial No. 616,318; the claims in the present case being restricted to features not disclosed in said companion application.

Various changes may be made without departing from the spirit and scope of my invention.

What I claim as new and desire to secure by Letters Patent, is:—

1. In a typewriting machine, the combination of a power driven carriage; escapement mechanism therefor including a feed rack and a feed device coöperative therewith, the rack being movable into and out of engagement with said coöperative feed device; and a plate-like member carried by and maintained on one side of the feed rack, said plate-like member extending longitudinally of the feed rack and having a plurality of projections each of which is effective to automatically move and disengage the rack from its coöperative feed device during the step-by-step feed movement of the carriage.

2. In a typewriting machine, the combination of a power driven carriage; escapement mechanism therefor including a feed rack and a feed device coöperative therewith, the rack being movable into and out of engagement with said coöperative feed device; a plate-like member carried by and maintained on one side of the feed rack, said plate-like member extending longitudinally of the feed rack and having a plurality of projections each of which is effective to automatically move and disengage the rack from its coöperative feed device during the step-by-step feed movement of the carriage; and means by which said plate-like member may be adjusted longitudinally of the feed rack to determine the points in the travel of the carriage where said disengaging projections shall become effective.

3. In a typewriting machine, the combination of a power driven carriage; escapement mechanism therefor including a feed rack and a feed device coöperative therewith, the rack being movable into and out of engagement with said coöperative feed device; a plate-like member carried by and maintained on one side of the feed rack, said plate-like member extending longitudinally of the feed rack and having a plurality of projections each of which is effective to automatically move and disengage the rack from its coöperative feed device during the step-by-step feed movement of the carriage; and means by which said plate-like member may be rendered operative or inoperative at will.

4. In a typewriting machine, the combination of a power driven carriage; escapement mechanism therefor including a feed rack and a feed device coöperative therewith, the rack being movable into and out of engagement with said coöperative feed device; a plate-like member carried by and maintained on one side of the feed rack, said plate-like member extending longitudinally of the feed rack and having a plurality of projections each of which is effective to automatically move and disengage the rack from its coöperative feed device during the step-by-step feed movement of the carriage; and means by which said plate-like member may be detached from the machine.

5. In a typewriting machine, the combination of a power driven carriage; escapement mechanism therefor including a feed rack and a feed device coöperative therewith, the rack being movable into and out of engagement with said coöperative feed device; and a disengaging device carried by the feed rack and arranged wholly at one side of the feed rack but coöperative during the travel of the carriage with said coöperative feed device to automatically move the feed rack and disengage it from said coöperative feed device and afford a free travel of the carriage for a limited extent in the direction of its feed.

6. In a typewriting machine, the combination of a power driven carriage; escapement mechanism therefor including a feed rack and a feed device coöperative therewith, the rack being movable into and out of engagement with said coöperative feed device; a disengaging device carried by and arranged wholly at one side of the feed rack but coöperative during the travel of the carriage with said coöperative feed device to automatically move the feed rack and disengage it from said coöperative feed device and afford a free travel of the carriage for a limited extent in the direction of its feed; and means for affording an adjustment of said disengaging member longitudinally of the feed rack without detaching the disengaging member from the machine.

7. In a typewriting machine, the combination of a power driven carriage; escapement mechanism therefor including a feed pinion and a feed rack which meshes therewith and which is movable into and out of engagement with said feed pinion; and a plate-like disengaging device which carries a plurality of disengaging projections each of which is effective to disengage the feed rack from the pinion at a predetermined point in the travel thereof in the direction of its feed to afford a limited free travel of the carriage in the direction of its feed.

8. In a typewriting machine, the combination of a power driven carriage; escapement mechanism therefor including a feed pinion and a feed rack which meshes therewith and which is movable into and out of engagement with said feed pinion; a plate-like disengaging device which carries a plurality of disengaging projections each of which is effective to disengage the feed rack from the pinion at a predetermined point in the travel thereof in the direction of its feed to afford a limited free travel of the carriage in the direction of its feed; and means for affording an adjustment of said disengaging device in the direction of the travel of the carriage to determine the points in the travel of the carriage where the disengagement between the rack and pinion shall take place.

9. In a typewriting machine, the combination of a power driven carriage; escapement mechanism therefor including a feed pinion and a feed rack which meshes therewith and which is movable into and out of engagement with said feed pinion; and a disengaging device carried by said feed rack and having a disengaging projection which is arranged at one side of the rack adjacent to a space between two teeth thereof to prevent the admission of a tooth of the feed pinion to said space and thereby automatically effect a disconnection between the rack and pinion during the feed of the carriage.

10. In a typewriting machine, the combination of a power driven carriage; escapement mechanism therefor including a feed pinion and a feed rack which meshes therewith and which is movable into and out of engagement with said feed pinion; and a plate-like disengaging device carried by said feed rack and having a plurality of disengaging projections thereon, each of said projections being arranged at one side of the feed rack adjacent to a space between two teeth thereof to prevent the admission of a tooth of the feed pinion to said space and thereby automatically effect a disconnection between the rack and pinion whenever one of said projections engages the pinion.

11. In a typewriting machine, the combination of a power driven carriage; escapement mechanism therefor including a feed rack and a coöperative device engaged by said feed rack, the feed rack being mounted to move into and out of engagement with said coöperative device; automatically operating means for disengaging said feed rack from its coöperative device at one point in the feed of the carriage to afford a free travel of the latter and for affording an automatic reëngagement of the rack with its coöperative device at another point in the travel of the carriage whereby a predetermined extent of skipping movement of the carriage in the direction of its feed is effected, and hand controlled means adjustable at will and effective by its adjustment to render said disengaging means operative or inoperative, as may be desired.

12. In a typewriting machine, the combination of a power-driven carriage; carriage feed mechanism including a feed pinion and a coöperative feed rack mounted for movement into and out of engagement with said feed pinion; automatically operating means for disengaging said feed rack from the pinion at a given point in the travel of the carriage in the direction of its feed and for affording a reëstablishment of the engagement between the feed rack and pinion after the carriage has traveled free a given distance; and hand controlled means adjustable at will and effective by its adjustment to render the disengaging means operative or inoperative to automatically disengage the feed rack and pinion.

13. In a typewriting machine, the combination of a power driven carriage; escapement mechanism therefor including a feed rack; adjustable means adjacent to the space between certain of the teeth of said rack for blocking the space, the adjustment of said means determining which of said spaces shall be blocked; and separate hand controlled means operable at will for rendering said space blocking means operative or inoperative as may be desired, the adjustment of said hand controlled means to one position rendering the blocking means operative and the adjustment of the hand controlled means to another position rendering the blocking means inoperative.

14. In a typewriting machine, the combination of a power driven carriage; escapement mechanism therefor including a feed rack; a device for blocking the space between certain teeth of said rack; means whereby said blocking device may be detached from the machine; and hand controlled means operable at will to render said blocking means operative or inoperative as may be desired and while said blocking means are maintained in place in the machine.

15. In a typewriting machine, the combination of a power driven carriage; escapement mechanism therefor comprising a feed rack and a coöperative feed device; a disengaging device carried by said feed rack and operative to automatically disengage the rack from its coöperative feed device at a predetermined point in the travel of the carriage; and means separate from said disengaging device and operable at will for rendering the disengaging device operative or inoperative as may be desired.

16. In a typewriting machine, the combination of a power driven carriage; escapement mechanism therefor comprising a feed rack and a coöperative feed device; a disengaging device carried by said feed rack and operative to automatically disengage the rack from its coöperative feed device at a predetermined point in the travel of the carriage; means by which an adjustment of said disengaging device may be effected to different points along said rack to determine at what point in the travel of the carriage the disengagement between the rack and its coöperative feed device shall take place; and means separate from said disengaging device and the adjustment thereof and operable at will to render the disengaging device operative or inoperative as may be desired.

17. In a typewriting machine, the combination of a power driven carriage; escapement mechanism therefor including a feed rack and a feed pinion; an automatically operative disengaging device operative during the travel of the carriage to disengage the feed rack from the pinion; and hand controlled means operable at will to effect a relative adjustment between said feed rack and pinion while engagement is maintained between the same to render the disengaging device operative or inoperative as may be desired.

18. In a typewriting machine, the combination of a power driven carriage; escapement mechanism therefor including a feed rack and a feed pinion; an automatically operative disengaging device operative during the travel of the carriage to disengage the feed rack from the pinion, and hand controlled means operable at will to effect a bodily movement of said feed pinion and thereby render the disengaging device operative or inoperative as may be desired.

19. In a typewriting machine, the combination of a power driven carriage; escapement mechanism therefor including a feed rack and a feed pinion; an automatically operative disengaging device operative during the travel of the carriage to disengage the feed rack from the pinion; and a hand controlled switch for effecting an axial movement of said feed pinion to move it into or out of the path of said disengaging device and thereby render the disengaging device operative or inoperative as may be desired.

20. In a typewriting machine, the combination of a power driven carriage; escapement mechanism therefor including a feed rack and a feed pinion; an automatically operative disengaging device operative during the travel of the carriage to disengage the feed rack from the pinion; a shifting device for effecting an axial movement of said feed pinion to move it into or out of the path of said disengaging device; a hand controlled member for controlling said shifting device; and indicating means associated with said hand controlled member to indicate the position to which the pinion has been moved.

21. In a typewriting machine, the combination of a power driven carriage; escapement mechanism therefor including an escapement wheel, a feed rack and a feed pinion operatively connected to turn with the escapement wheel and mounted to receive an axial movement; automatically operating tabulating mechanism; and controlling means for rendering said automatically operating tabulating mechanism operative or inoperative as may be desired, said controlling means comprising hand controlled means for moving said feed pinion axially and for maintaining it in the axial position to which it may be moved.

22. In a typewriting machine, the combination of a power driven carriage; escapement mechanism therefor including an escapement wheel, a feed rack, and a feed pinion operatively connected to turn with the escapement wheel and mounted to receive an axial movement; automatically operating tabulating mechanism comprising a series of disengaging devices adapted to be brought into engagement with the feed pinion during the travel of the carriage to automatically effect a disengagement between the feed rack and pinion; and hand controlled means for moving said pinion axially into and out of the path of said disengaging devices.

23. In a typewriting machine, the combination of a power driven carriage; escapement mechanism therefor including an escapement wheel, a feed rack and a feed pinion operatively connected to turn with the escapement wheel and mounted to receive an axial movement; automatically operating tabulating mechanism comprising a series of disengaging devices adapted to be brought into engagement with the feed pinion during the travel of the carriage to automatically effect a disengagement between the feed rack and pinion; and hand controlled means for moving said pinion axially into and out of the path of said disengaging devices, said hand controlled means comprising a cam coöperative with the feed pinion to shift it axially, the cam being adapted to remain in either one of the positions to which it may be moved, and a finger piece by which said cam is controlled.

24. In a typewriting machine, the combination of a carriage, a machine frame on which the carriage travels, a spring pressed slide carried by one of said parts, a margin stop carried by the other of said parts, and a coöperative margin stop carried by and pivoted to said spring pressed slide.

25. In a typewriting machine, the combination of a carriage, a slide carried by and having a limited sliding movement on the carriage, a spring which tends to hold said slide at the limit of its movement in one direction, a margin stop carried by and pivoted on said slide, a stop on the slide to coöperate with the pivoted margin stop to limit its turning movement in one direction, and a second margin stop on the frame of the machine.

Signed at Syracuse, in the county of Onondaga, and State of New York this 20th day of March, A. D. 1911.

HERBERT H. STEELE.

Witnesses:
WILLARD C. HAY,
FRANK MEIER.